United States Patent [19]

Wank et al.

[11] Patent Number: 5,085,718
[45] Date of Patent: Feb. 4, 1992

[54] PROCESS FOR BONDING A CARDBOARD BLANK LAMINATED WITH PLASTIC FILM, PARTICULARLY FOR HINGE-LID CIGARETTE PACKETS

[76] Inventors: Gerhard Wank, 2080 Pinneberg; Berthold Winter, 2000 Hamburg, both of Fed. Rep. of Germany

[21] Appl. No.: 473,669

[22] Filed: Feb. 2, 1990

[30] Foreign Application Priority Data

Feb. 3, 1989 [DE] Fed. Rep. of Germany ....... 3903201

[51] Int. Cl.$^5$ ................................................ B65B 7/20
[52] U.S. Cl. ........................................ 156/69; 156/153; 156/257; 156/281; 156/290; 53/484
[58] Field of Search ................ 53/477, 484, 375, 383, 53/375.5, 375.7, 375.8, 383.1; 156/69, 153, 257, 581, 281; 493/185; 229/3.1; 136/290

[56] References Cited

U.S. PATENT DOCUMENTS

| | | | |
|---|---|---|---|
| 689,663 | 12/1901 | Walker | 229/3.1 X |
| 1,536,801 | 5/1925 | Labombarde | 427/326 X |
| 1,962,660 | 6/1934 | Keller | 229/3.1 X |
| 2,268,245 | 12/1941 | Davis | 229/3.1 X |
| 2,770,080 | 11/1956 | Hoyt | 156/153 X |
| 2,988,528 | 6/1961 | Tench et al. | 229/3.1 X |
| 3,113,899 | 12/1963 | Hoag et al. | 156/581 X |
| 4,051,286 | 9/1977 | Abbott | 156/295 X |
| 4,167,092 | 9/1979 | Medwed | 156/581 X |

*Primary Examiner*—Michael W. Ball
*Assistant Examiner*—Mark A. Osele
*Attorney, Agent, or Firm*—Pravel, Gambrell, Hewitt, Kimball & Krieger

[57] ABSTRACT

An apparatus and a process for bonding a cardboard blank which has been coated or laminated with a plastic film, and particularly for hinge-lid packets such as cigarette packets on a continuously operated packing machine. The plastic film and a portion of the underlying cardboard material are first treated to expose a more suitable surface for bonding. Preferably, such treatment is by contacting with an apparatus which penetrates the plastic coating and creates depressions in the underlying cardboard. Subsequently, an adhesive is applied to the treated surface. The treated surface is compressed with the complementary area of the cardboard blank to be bonded. The apparatus of the invention comprises a heatable member whose contact surface may be comprised several rows of juxtaposed points or tips which may be approximately 1 to 5 mm in height.

8 Claims, 2 Drawing Sheets

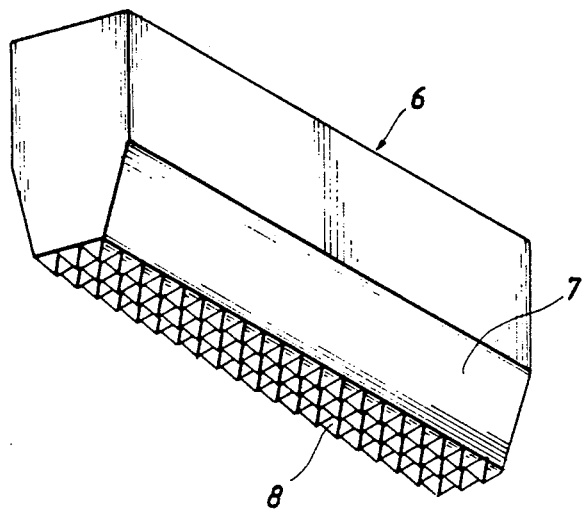
FIG.2
FIG.4
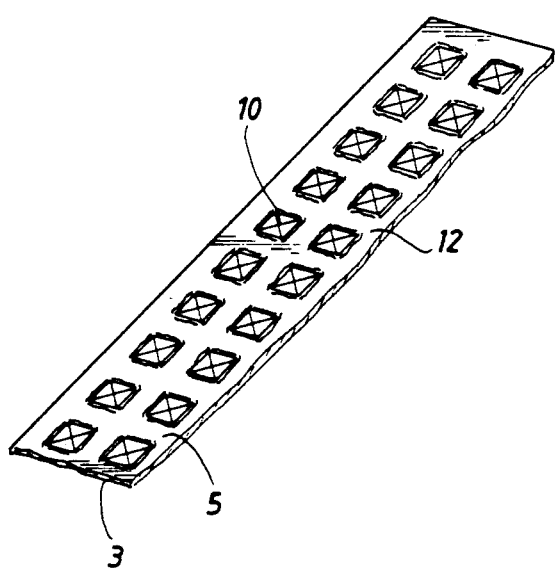
FIG.3
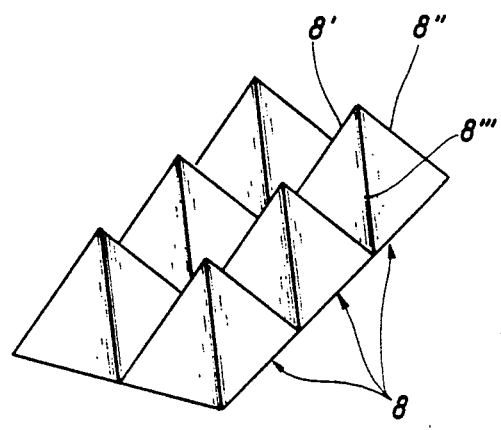

PROCESS FOR BONDING A CARDBOARD BLANK LAMINATED WITH PLASTIC FILM, PARTICULARLY FOR HINGE-LID CIGARETTE PACKETS

1. FIELD OF THE INVENTION

The present invention relates to an apparatus and a process for bonding a cardboard blank laminated with a plastic film on the decorative or outer surface, more particularly for hinge-lid cigarette packets, on a continuously operating packing machine.

2. BACKGROUND OF THE INVENTION

In commercial packaging applications such as commercial cigarette packaging, it is desirable to produce a packet which is decorative and which is durably sealed. Such packets are generally prepared from preformed cardboard blanks, which have been decorated or contain printed areas on one side of the blank. The blanks may be precreased, and are designed to be folded and bonded in a manner so as to create a complete packet.

Packets, for example, cigarette packets, may be produced in a continuously operating packing. Cardboard blanks are fed from a stack to a folding station. A measured number of cigarettes is foil-wrapped, for example with an aluminum foil, and then fed onto a cardboard blank to be folded and sealed, or bonded. An adhesive is applied to the areas of the blank to be bonded, generally to the side and top flaps. The areas to be bonded are then compressed and a completed packet is released from the packing machine.

Bonding of the cardboard blank to form the packet generally is accomplished by the application of an adhesive to specific areas of the blank, for example, on the side and top flaps or corner flaps of the lid. Bonding is completed by compressing these areas with the complementary area of the blank to be bonded. The adhesive is generally a hot-melt adhesive or a cold glue. In order to permit better adhesion of the areas to be bonded, conventional printed cardboard blanks have no printing in the areas to be bonded.

Many commercial packaging applications require the use of cardboard blanks which have been laminated on one surface, generally the decorative surface, with plastic films. Because the plastic films and the cardboard web are generally laminated as a uniform surface material, the areas to be bonded are not excluded from the lamination.

Problems arise when using plastic coated blanks, however. Packets produced from plastic coated blanks may not be stably bonded, because the hot melt adhesives conventionally used for example, in the bonding of cigarette packets, do not adhere adequately to plastic-coated surfaces. For example, at increased temperatures as in summer, a separation of the bonded areas of a cigarette packet takes place, particularly the side or top corner flaps of the packets.

In addition, the bonding of packets which have bevelled or chamfered longitudinal edges, for example, those disclosed in European Patent No. EU-A-1 0204 933, is particularly problematic, because the cross-sectionally octagonal or side area-rounded packets provide a smaller adhesive surface for bonding, and because such hinge-lid packets are exposed to higher loads of lateral pressure, for example, in the user's pocket.

Other adhesives, such as fast-action or secondary adhesives are not suitable to overcome these bonding problems, as their contact with the contents of, for example, a cigarette packet may lead to an increased risk to the health and safety of the consumer It would be of great utility to provide an adhesion process for durably bonding cardboard blanks which have been laminated with a plastic film using conventional hot melt adhesives.

SUMMARY OF THE INVENTION

The present invention is directed to an apparatus and a method for durably bonding cardboard blanks using conventional hot melt adhesives. The apparatus and method of the present invention are particularly useful in the bonding of cardboard blanks which have been laminated with plastic films, such as cigarette packets, and more particularly for hinge-lid packets, including those having rounded or bevelled longitudinal edges.

In the process of the present invention, cardboard blanks coated with a plastic film on the decorative or outer surfaces, and particularly hinge-lid cigarette packets are bonded, for example, on a continuously operated packing machine. In the areas which are to be bonded, the plastic film and a part of the cardboard material located below it are scored or otherwise treated to provide a more adequate surface for bonding. An adhesive is applied to the treated surface which is next compressed with the complementary area of the cardboard blank to be bonded.

The apparatus of the present invention is comprised of a heatable member capable of scoring or otherwise treating the plastic-coated surface to provide a more adequate bonding surface. Preferably, the heatable member includes a contact surface having several rows of juxtaposed tips or points which penetrate the plastic coating and the underlying cardboard of the blank to expose a surface suitable for stable bonding.

Examples of the more important features of this invention have been summarized rather broadly in order that the detailed description which follows may be better understood. There are, of course, additional features of the invention which will be described hereafter, and which will also form the subject of the claims appended hereto.

BRIEF DESCRIPTION OF THE DRAWINGS

In order to more fully understand the drawings referred to in the detailed description of the present invention, a brief description of each drawing is provided

FIG. 2 is a longitudinal view of the contact surface of the apparatus of the present invention.

FIG. 3 is a drawing of the tips on the contact surface of the apparatus of the present invention.

FIG. 4 is a surface view of a laminated cardboard blank which has been treated by the apparatus of the present invention.

DETAILED DESCRIPTION OF THE INVENTION

Figure 1:
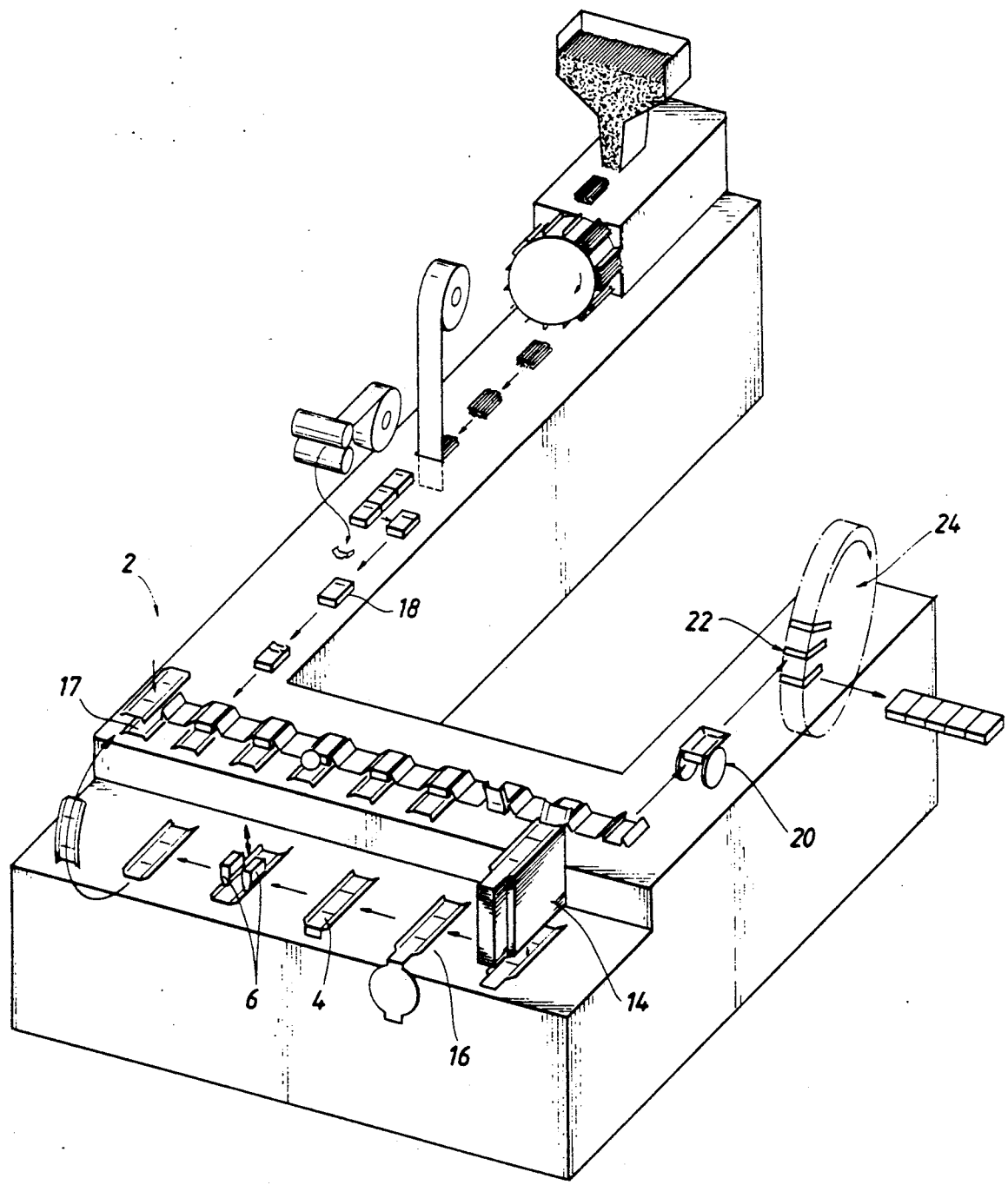
FIG. 1 is a perspective view of a packing machine.

Referring to FIG. 1, a perspective view of a packing machine 2 is illustrated. Cardboard blanks 4 are supplied from a stack 14 to a folding station 16. A surface of a blank 4 is scored or otherwise treated to produce a more suitable bonding surface, for example by contact with the apparatus 6 of the present invention. Cigarettes, enveloped in foil 18, preferably an aluminum foil, are conveyed in block form to the precreased blank 4. Following the folding station, an adhesive 20 is applied to the areas to be bonded, generally to the side and corner flaps, for example to the side flaps and top corner flaps of a packet such as a hinge-lid cigarette packet, and preferably to the surfaces which have been treated. The packet 22 is then folded and led into a drying drum 24 and discharged following the compression of the bonded areas. While FIG. 1 illustrates the process of the present invention using a multi-station packing machine, it is also contemplated that a single-station packing machine may be utilized. Additional machine designs are also contemplated in which treatment of the areas of the blank to be bonded may follow the folding process.

In the method of the present invention, the plastic coated blanks 4 are scored or otherwise treated to produce a surface more suitable for bonding. In general, such treatment penetrates the plastic coating and underlying cardboard, thereby providing an exposed area of the cardboard for bonding. Preferably, the treatment creates depressions in the underlying cardboard. Most preferably, the treatment results in the melting of the plastic coating and exposure of the underlying cardboard. A bonding surface of the blank may be completely or zonally treated in the vicinity of the side flaps or top corner flaps, for example of a hinge-lid packet blank.

As shown in FIG. 4, the treatment of a plastic coated cardboard blank according to process of the present invention results in the exposure of a more suitable bonding surface 12. Preferably, this surface 12 is comprised of crater-like depressions 10 which penetrate the plastic film 5 and enter the underlying cardboard 3. The size of the depressions may vary with the type of cardboard used and the structure of the apparatus 6 employed, but generally will be approximately 0.5 to 1.5 mm in depth, approximately 0.2 to 1.0 mm in width, and approximately 1.5 to 4.0 mm in diameter.

In the preferred method, an apparatus 6 is heated to temperatures in the approximate range of 150° C. to 400° C., and most preferably to approximately 300° C. Upon contact with the heated apparatus 6, the plastic film coating 5 melts, and depressions 10 are created in the underlying cardboard 4 material.

After the blanks 4 have been treated, an adhesive such as a hot-melt adhesive is applied to a bonding surface of the cardboard blank, and preferably to the treated surface 10 of the blank 4. Most preferably, the adhesive penetrates the depressions 10 in the treated blank, which is next pressed or compressed with a complementary area of the cardboard blank for bonding.

In a preferred embodiment, a hot-melt adhesive is only applied to the outer marginal area of the treated side flaps, whereas in the adjacent, inwardly directed area of the side flaps a cold glue may be applied. This embodiment offers the advantage that a hot-melt adhesive coating is only applied to a limited width and specifically to the outer areas of the flaps which more easily burst open under thermal stressing, while the inner area of the flap, which is already held in position, is bonded by a normal cold glue.

Standard, commercially available hot-melt adhesives may be used in the method of the present invention, further, the cardboard blanks for use in the present invention may be in the range of approximately 200 to 500 g/m² in weight, and preferably are approximately 275 g/m². The cardboard blanks may be laminated with a coating of plastic such as a polyethylene, polypropylene, or acetate film. The thickness of the plastic coating may be in the range of approximately 10 to 20 μm, preferably approximately 15 μm.

Referring to FIG. 2, the apparatus 6 of the present invention is comprised of a heatable member 6 capable of penetrating the plastic coating and underlying cardboard of a blank to provide a more suitable surface area for bonding. Preferably, the contact surface 7 of the apparatus 6 is comprised of juxtaposed points or tips 8. The tips 8 may be arranged in multiple rows, for uniform surface treatment. In the preferred embodiment, approximately 4 to 8 points or tips 8 are arranged in rows with a spacing of approximately 2 to 3 mm between tips 8. The tips 8 may be conical in shape, but are preferably, as shown in FIG. 3, pyramidal, and preferably are comprised of cutting surfaces 8', 8'', or 8'''. The base 21 of each tip 8 may be triangular, rectangular, or multiangular in shape, but preferably is rectangular. The height of each tip 8 will vary with the weight and thickness of the cardboard blanks. In the preferred embodiment, the height of each tip 8 is from about 1 to about 5 mm.

The foregoing disclosure and description of the invention are illustrative and explanatory thereof and various changes in the size, shape, and materials as well as in the details of the preferred embodiment may be made without departing from the spirit and scope of the present invention as claimed.

We claim:

1. A process for bonding a plastic-coated cardboard blank comprising the steps of:
    a) contacting the plastic coated surface of the blank with a tool having tips with cutting surfaces to penetrate the plastic coating and to create a plurality of depressions in the cardboard blank thereby creating a treated surface;
    b) applying an adhesive to the treated surface whereby the adhesive penetrates in the depressions; and
    c) compressing the adhesive-containing surface with an area of the cardboard blank to which the surface is to be bonded.

2. The process of claim 1, wherein the plastic coated surface of the blank is zonally treated.

3. The process of claim 1, wherein the blank includes side and top flaps, and wherein the treated surface is selected from side flaps, or top flaps, and mixtures thereof.

4. The process of claim 1, wherein the blank is a hinge-lid packet blank having top corner flaps, and wherein the treated surface includes the top corner flaps of the hinge-lid packet blank.

5. The process of claim 1, wherein a hot melt adhesive is applied to the treated surface.

6. The process of claim 1, wherein the treated surface includes an outer marginal area and an inner central area, and wherein a hot melt adhesive is applied to the outer marginal area and a cold glue is applied to the inner central area.

7. The process of claim 1, wherein said contacting is with a tool having a heatable member.

8. A process for bonding a plastic first surface of a plastic coated cardboard blank to a cardboard second surface of a plastic coated cardboard blank comprising the steps of:
    a) contacting the plastic coated first surface of the blank with a tool heated to a temperature in the range of 150° C.–400° C. to penetrate the plastic coating and to create a plurality of depressions in the underlying cardboard;

b) applying a hot melt adhesive to the contacted surface whereby the adhesive penetrates in the depressions; and c) compression the adhesive-containing first surface with the cardboard second surface to which it is to be bonded.

* * * * *